United States Patent
Mutter et al.

(10) Patent No.: US 10,776,307 B2
(45) Date of Patent: Sep. 15, 2020

(54) SUBSCRIBER STATION FOR A SERIAL BUS SYSTEM, AND METHOD FOR TRANSMITTING A MESSAGE IN A SERIAL BUS SYSTEM

(71) Applicant: Robert Bosch GmbH, Stuttgart (DE)

(72) Inventors: Arthur Mutter, Neuhausen (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/543,026

(22) Filed: Aug. 16, 2019

(65) Prior Publication Data
US 2020/0057745 A1    Feb. 20, 2020

(30) Foreign Application Priority Data

Aug. 17, 2018  (DE) .......................... 10 2018 213 915
Jan. 31, 2019   (DE) .......................... 10 2019 201 230

(51) Int. Cl.
G06F 13/42    (2006.01)
G06F 13/20    (2006.01)

(52) U.S. Cl.
CPC .......... *G06F 13/4282* (2013.01); *G06F 13/20* (2013.01)

(58) Field of Classification Search
None
See application file for complete search history.

(56) References Cited

U.S. PATENT DOCUMENTS

| 7,551,612 | B2 * | 6/2009 | Kobayashi ................ H04L 5/16 370/368 |
| 2014/0298133 | A1 * | 10/2014 | Hartwich ............ G06F 13/4295 714/758 |
| 2015/0003434 | A1 * | 1/2015 | Shi ........................ H04W 48/16 370/338 |
| 2019/0260607 | A1 * | 8/2019 | Weissennnayer ... G06F 13/4063 |
| 2019/0278738 | A1 * | 9/2019 | Mutter ................ G06F 13/4295 |
| 2019/0342115 | A1 * | 11/2019 | Lieder ..................... H04L 43/16 |

FOREIGN PATENT DOCUMENTS

DE    10 2012 209 093 A1    12/2013

OTHER PUBLICATIONS

ISO 11898:1-2015, Road Vehicles—Controller Area Network (CAN), 2nd Edition, 2015.

* cited by examiner

*Primary Examiner* — Henry Tsai
*Assistant Examiner* — Aurangzeb Hassan
(74) *Attorney, Agent, or Firm* — Norton Rose Fulbright US LLP; Gerard Messina

(57) ABSTRACT

A subscriber station for a serial bus system is described. The subscriber station includes a communication control device for generating a message to serially transmit on the bus system, and/or for reading a message that has been serially received by the subscriber station on the bus system. The communication control device is configured to decide whether there exists, for aborting a serial transmission of the frame onto the bus line which is currently being carried out, an abortion criterion according to which a serial transmission of a higher-priority frame for a message is more important than the serial transmission of the frame onto the bus line which is currently being carried out, and to provide in the frame currently being serially transmitted, on the basis of the decision that has been made, a signalization as to whether or not the frame currently being serially transmitted is to be aborted.

16 Claims, 4 Drawing Sheets

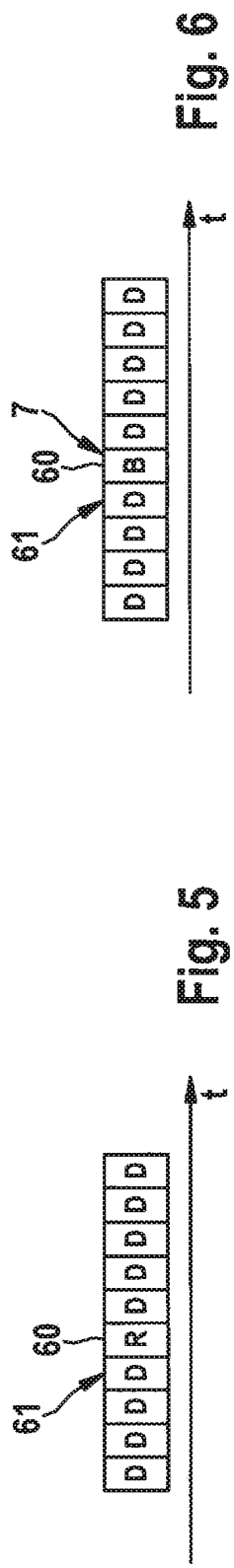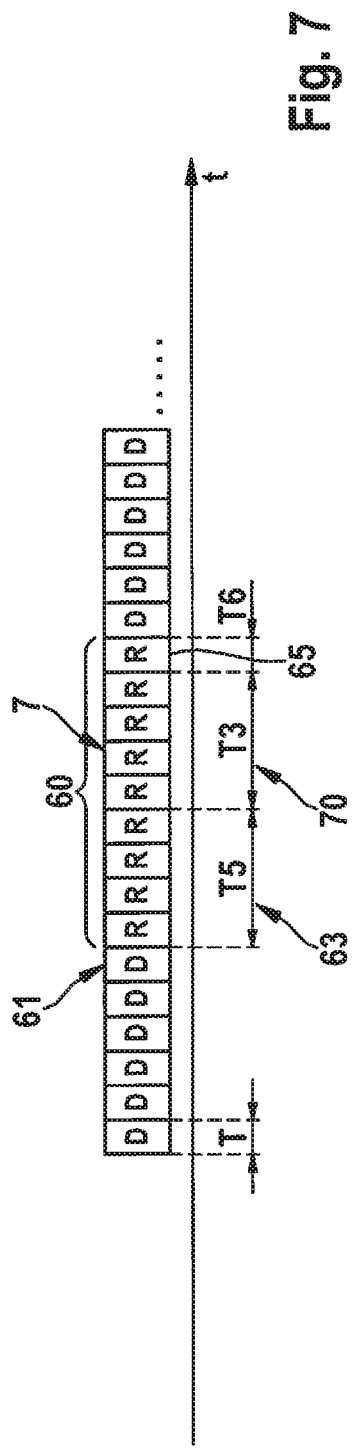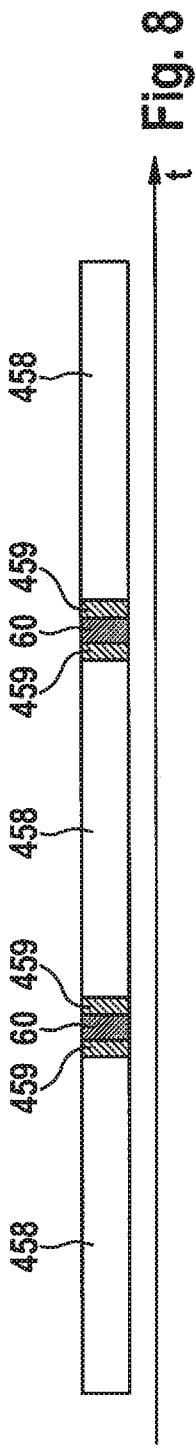

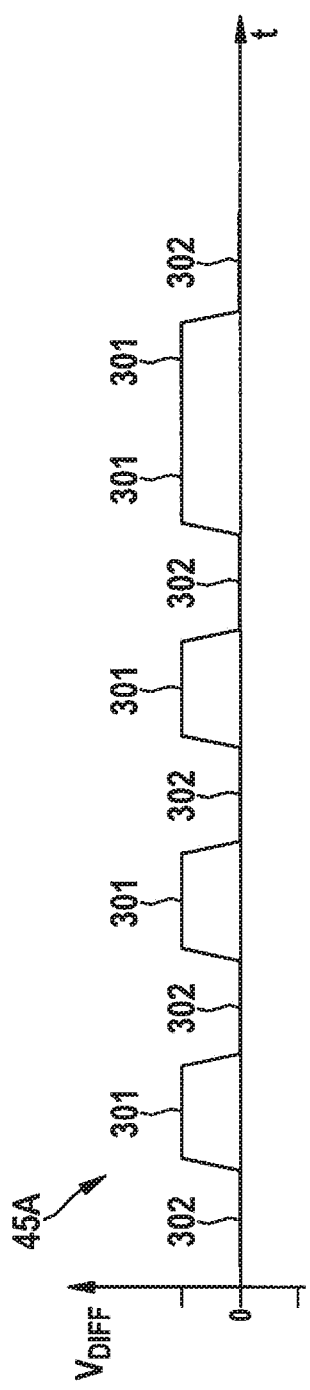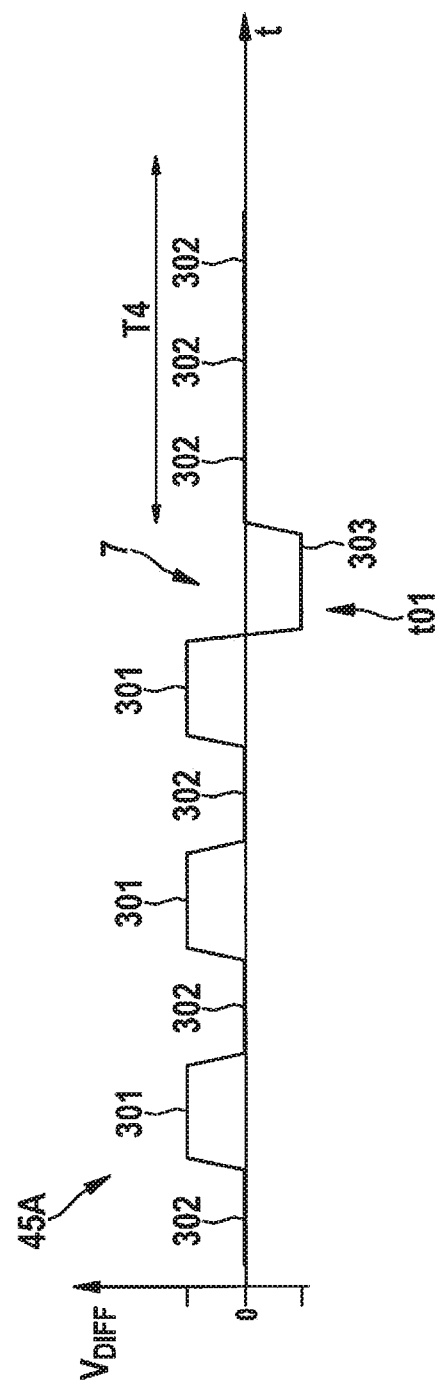

SUBSCRIBER STATION FOR A SERIAL BUS SYSTEM, AND METHOD FOR TRANSMITTING A MESSAGE IN A SERIAL BUS SYSTEM

CROSS REFERENCE

The present application claims the benefit under 35 U.S.C. § 119 of German Patent Application No. DE 102018213915.6 filed on Aug. 17, 2018, and German Patent Application No. DE 102019201230.2 filed on Jan. 31, 2019, each of which is expressly incorporated herein by reference in its entirety.

FIELD

The present invention relates to a subscriber station for a serial bus system and to a method for transferring a message in a serial bus system which operates with a high data rate and excellent error robustness.

BACKGROUND INFORMATION

A bus system in which data are transferred as messages under the ISO 11898:1-2015 standard constituting the CAN protocol specification, using CAN FD, is often used for communication between sensors and control devices, for example in vehicles. The messages are transferred between the bus subscribers of the bus system, e.g., a sensor, control device, transducer, etc.

German Patent Application No. DE 10 2012 209 093 A1 describes a subscriber station of a bus system which is capable, in the context of an error in a CAN bus communication, of aborting a message at an arbitrary abortion point. The message must then be transmitted again, which increases bus occupancy.

As the number of functions of a technical system or a vehicle rises, the data traffic in the bus system also increases. In addition, it is often required that the data be transferred from the transmitter to the receiver more quickly than before. A consequence of this is that the required bandwidth of the bus system will increase even further.

In order to allow data to be transferred at a higher bit rate than with CAN, an option for switching over to a higher bit rate within a message was created in the CAN FD message format. With such techniques, the maximum possible data rate is increased beyond a value of 1 Mbit/sec by using a faster cycle time in the region of the data fields. Such messages are also referred to hereinafter as "CAN FD frames" or "CAN FD messages." With CAN FD, the payload data length is extended from eight to as many as 64 bytes, and data transfer rates are appreciably higher than with CAN.

Although a CAN- or CAN FD-based communication network offers a very large number of advantages, for example with regard to its robustness, its speed is nevertheless much lower as compared with a data transfer in, for example, 100 BASE-T1 Ethernet. In addition, the payload data length of up to 64 bytes which has hitherto been reached with CAN FD is too short for some applications.

SUMMARY

An object of the present invention is to provide subscriber stations for a serial bus system, and a method for transferring a message in a serial bus system, which solve the problems described above. An object of the present invention is to provide subscriber stations for a serial bus system, and a method for transferring a message in a serial bus system, in which a high data rate, and an increase in the quantity of payload data per frame, can be achieved with excellent error robustness.

The object may be achieved by way of a subscriber station for a serial bus system in accordance with the present invention. The example subscriber station encompasses: a communication control device for generating a message that is to be serially transmitted to at least one other subscriber station of the bus system, and/or for reading a message that has been serially received by the subscriber station from at least one other subscriber station of the bus system; and a transmit/receive device for transmitting the generated message in a frame onto a bus line to at least one other subscriber station of the bus system, and/or for receiving a frame of a message from the bus line; the communication control device being configured to decide whether there exists, for aborting a serial transmission of the frame onto the bus line which is currently being carried out, an abortion criterion according to which a serial transmission of a higher-priority frame for a message is more important than the serial transmission of the frame onto the bus line which is currently being carried out; and the communication control device being configured to provide in the frame currently being serially transmitted, on the basis of the decision that has been made, a signalization as to whether or not the frame currently being serially transmitted is to be aborted.

The above-described example subscriber station helps contribute to optimum utilization of the availability of the bus of the bus system with no blockage of high-priority messages that are intended, for example, to convey, to at least one other subscriber station of the bus system, states that are critical for a technical system. As long as no high-priority messages are present, data can be transmitted for as long as possible at a higher data rate than in another communication phase. Critical states of the technical system can nevertheless be reacted to quickly, since lower-priority messages can be aborted with the desired rapidity. The result is that the net data transfer rate of the bus system can be optimized, and events that occur suddenly during operation of the subscriber stations can be taken into account very quickly. This helps contribute to reliable operation of the technical system for which the bus system is being used.

The example method carried out by the subscriber station can be utilized even if at least one classic or classical CAN subscriber station that can transmit messages in accordance with the classic CAN protocol, and/or at least one CAN FD subscriber station that can transmit messages in accordance with the CAN FD protocol, is also present in the bus system.

In addition, the format with the very long frames that is used for transferring payload data allows a considerable increase in the bit rate, and thus in the transfer speed from transmitter to receiver, to be achieved. Because of the configuration of the subscriber station, error frames are no longer required, although it is still possible to work with error frames if desired. This helps contribute to achieving a net data rate of at least 10 Mbps. In addition, the volume of payload data can be, in particular, up to 4096 bytes per frame.

Advantageous further embodiments of the subscriber station are described herein.

The communication control device is preferably configured to halt transmission of the frame currently being serially transmitted after transmission of a abort signal constituting the signalization, the transmit/receive device being configured to halt reception of the frame currently being serially transmitted after transmission of the abort signal constituting the signalization. Transmission of the higher-priority frame can thereby be accelerated.

According to the various exemplifying embodiments, the communication control device is configured to provide in the frame currently being serially transmitted, at at least one predetermined point for the signalization, a predetermined designated break point which the at least one other subscriber station can use for aborting the frame currently being serially transmitted.

According to the various exemplifying embodiments, the communication control device is configured to provide the signalization at a predetermined designated break point that is provided at at least one predetermined point in the frame currently being serially transmitted.

In the context of an option, the predetermined designated break point has at least one bit.

According to a special variant embodiment, the communication control device is configured, for the signalization, to overwrite, with a predetermined other bus state, a bus state that is provided in the frame currently being serially transmitted.

The bus state provided in the frame currently being serially transmitted is possibly a recessive bus state, the predetermined other bus state being a dominant bus state or a negatively dominant bus state, or having a greater difference voltage than in the case of the dominant bus state.

It is possible for the communication control device to be configured to transmit a message to the bus line using a first and a second communication phase; in the first communication phase, a negotiation occurring as to which of the subscriber stations is to acquire at least temporarily, in the subsequent second communication phase, exclusive collision-free access to the bus line. The communication control device can be configured to generate the message in such a way that bits in the first communication phase have a bit time that is longer by at least a factor of 10 than a bit time of bits that are driven onto the bus line in the second communication phase.

The communication control device can furthermore be configured to provide, at at least one predetermined point in the first communication phase, a recessive bit constituting a predetermined designated break point for the signalization.

According to an exemplifying embodiment, the communication control device is configured to provide, at at least one predetermined point in the second communication phase, a predetermined number of recessive bits constituting a predetermined designated break point for the signalization; the predetermined number of recessive bits being defined in consideration of an addition of time spans T5+T3+T6; the time span T5 being the maximum transit time of a signal in the bus system from the subscriber station to the farthest end of the bus line and back; the time span T3 being the time span for transmission of the signalization; and the time span T6 being the duration of an optional safety reserve that encompasses a predetermined number of bits so that subsequent data are not overwritten by the signalization.

According to an exemplifying embodiment, the communication control device is configured to provide, at at least one predetermined point in the second communication phase, a switchover phase in which, before a predetermined designated break point for the signalization, a switchover occurs to a slower bit rate than the bit rate of the second communication phase, and the communication control device being configured to provide, after the predetermined designated break point, a switchover phase in which a switchover occurs from the slower bit rate back to the faster bit rate of the second communication phase. Optionally, the communication control device is configured also to continue transferring the data of the second communication phase in the predetermined designated break point and/or in the switchover phase.

The communication control device can furthermore be configured to furnish for other devices of the subscriber station, as a datum in a register, a remaining transmission time span of a message currently being transmitted and/or the already-received bits of the identifier.

At least two of the previously described subscriber stations can be part of a bus system that has a bus line, the at least two subscriber stations being connected to one another via the bus line in such a way that the at least two subscriber stations can communicate serially with one another.

The aforementioned object may also be achieved by way of an example method for transmitting a message in a serial bus system according to the present invention. The example method has the steps of: generating, with a communication control device, a message that is to be serially transmitted to at least one other subscriber station of the bus system, and/or reading a message that has been serially received by the subscriber station from at least one other subscriber station of the bus system; and transmitting, with a transmit/receive device, the generated message in a frame onto a bus line to at least one other subscriber station of the bus system, and/or receiving, with the transmit/receive device, a frame of a message from the bus line; the communication control device deciding whether there exists, for aborting a serial transmission of the frame onto the bus line which is currently being carried out, an abortion criterion according to which a serial transmission of a higher-priority frame for a message is more important than the serial transmission of the frame onto the bus line which is currently being carried out; and the communication control device providing in the frame currently being serially transmitted, on the basis of the decision that has been made, a signalization as to whether or not the frame currently being serially transmitted is to be aborted.

The method offers the same advantages that have been recited previously with reference to the subscriber station.

Further possible implementations of the present invention encompass combinations, including those not explicitly recited, of features or embodiments described previously or hereinafter with reference to the exemplifying embodiments. One skilled in the art will also add individual aspects as improvements or additions to the respective basic form of the present invention.

BRIEF DESCRIPTION OF THE DRAWINGS

The present invention is described below in further detail on the basis of exemplifying embodiments and with reference to the figures.

FIGS. 5 and 6 are respective diagrams to illustrate an example of a designated break point for a frame in the context of the first exemplifying embodiment.

FIG. 7 is a diagram to illustrate an example of a bit field having M bits to be serially transmitted, for a frame in the context of a second exemplifying embodiment.

FIG. 8 is a diagram to illustrate an example of designated break point bits (SB bits) that have been embedded by bit-rate switchover into a data phase of the frame, in the context of a third exemplifying embodiment.

FIG. 9 shows a time course of an example of a signal that is transmitted between the subscriber stations in accordance with a fourth exemplifying embodiment, the signal being transmitted without abortion.

FIG. 10 shows a time course of an example of a signal that is transmitted between the subscriber stations in a bus system in accordance with the fourth exemplifying embodiment, said signal being aborted on the basis of a method carried out in the bus system.

DETAILED DESCRIPTION OF EXAMPLE EMBODIMENTS

Figure 1:
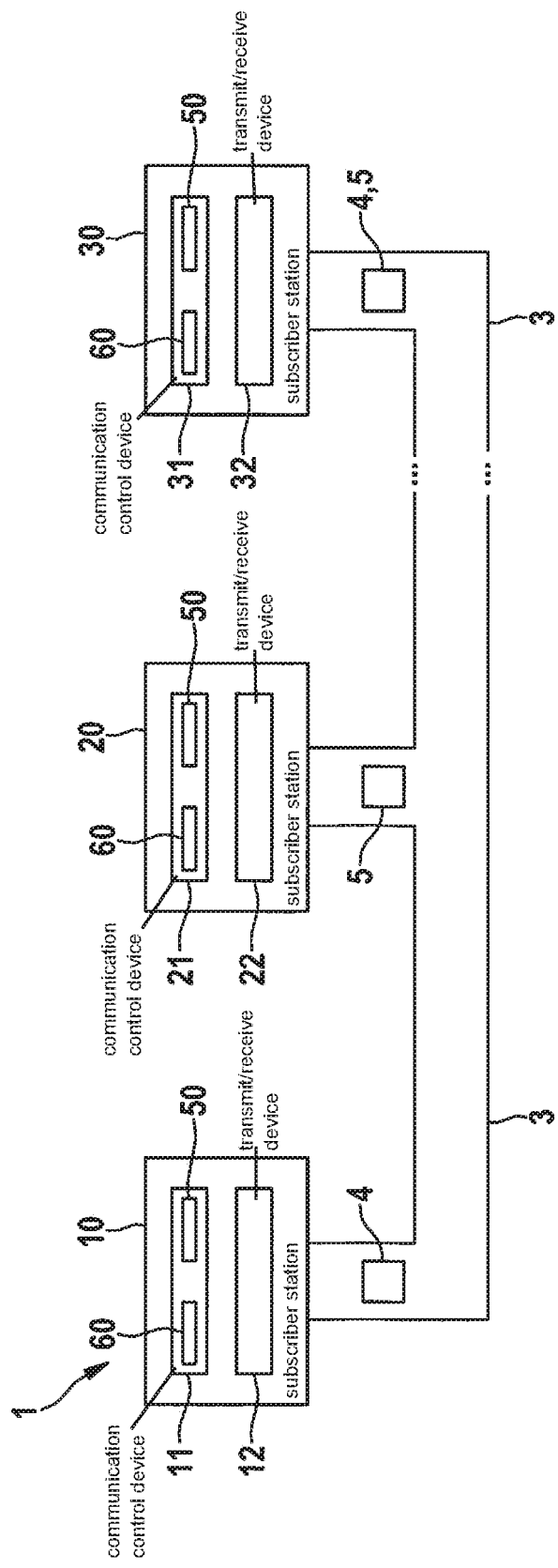
FIG. 1 is a simplified block diagram of a bus system in accordance with a first exemplifying embodiment.

In the Figures, identical or functionally identical elements are labeled with the same reference characters unless otherwise indicated.

FIG. 1 shows, as an example, a bus system 1 that is configured in particular as the basis for a CAN bus system, a CAN FD bus system, a CAN FE bus system, and/or variants thereof, as described below. Bus system 1 can be utilized in a vehicle, in particular a motor vehicle, an aircraft, etc., or in a hospital, etc.

In FIG. 1, bus system 1 has an, in particular parallel, bus line 3 to which a plurality of subscriber stations 10, 20, 30 are connected. Messages 4, 5 in the form of signals are serially transferable via bus line 3 between the individual subscriber stations 10, 20, 30. Subscriber stations 10, 20, 30 are, for example, control devices, sensors, display apparatuses, etc. of a motor vehicle.

As shown in FIG. 1, subscriber station 10 has a communication control device 11 and a transmit/receive device 12. Subscriber station 20, on the other hand, has a communication control device 21 and a transmit/receive device 22. Subscriber station 30 has a communication control device 31 and a transmit/receive device 32. Stored in each of communication control devices 11, 21, 31 is an abortion criterion 50 that defines the conditions under which a message 4, 5 transmitted via bus line 3 may be aborted. Each of communication control devices 11, 21, 31 optionally has a register 60 that is configured in particular as a flip-flop, memory, etc., for storing information that may be relevant for communication control devices 11, 21, 31 and/or the pertinent subscriber station 10, 20, 30. Transmit/receive devices 12, 22, 32 of subscriber stations 10, 20, 30 are each connected directly to bus line 3, even though this is not illustrated in FIG. 1.

Communication control devices 11, 21, 31 each serve to control communication by the respective subscriber station 10, 20, 30, via bus line 3, with another subscriber station of subscriber stations 10, 20, 30 that are connected to bus line 3.

Communication control device 11 can be embodied as a conventional CAN controller. Communication control device 11 generates and reads first messages 4, for example classic CAN messages 4. Classic CAN messages 4 are constructed in accordance with the classic basic format, in which message 4 can encompass a quantity of up to eight data bytes. Alternatively, classic CAN message 4 is constructed as a CAN FD message, in which a quantity of up to 64 data bytes can be encompassed and can furthermore be transferred at a considerably faster data rate than in the case of classic CAN message 4. In the latter case, communication control device 11 is embodied as a conventional CAN FD controller.

Communication control device 21 generates and reads two messages 5 that, for example, are modified CAN messages 5. Modified CAN messages 5 are constructed on the basis of a CAN FE format that is described in more detail with reference to FIG. 2.

Communication control device 31 can be embodied to furnish for transmit/receive device 32 or receive therefrom, as necessary, a classic CAN message 4 or a CAN FE message 5. Communication control device 31 therefore generates and reads a first message 4 or a second message 5, first and second messages 4, 5 differing in terms of their data transfer standard, i.e. in this case CAN or CAN FE. Alternatively, classic CAN message 4 is constructed as a CAN FD message. In the latter case, communication control device 11 is embodied as a conventional CAN FD controller.

Transmit/receive device 12 can be embodied as a conventional CAN transceiver or CAN FD transceiver. Transmit/receive device 22 can be embodied, except for the differences described below in further detail, as a CAN FE transceiver. Transmit/receive device 32 can be embodied to furnish for communication control device 31 or receive therefrom, as necessary, messages 4 in accordance with the current CAN basic format or messages 5 in accordance with the CAN FE format. Transmit/receive devices 22, 32 are additionally or alternatively embodiable as a conventional CAN FD transceiver.

With the two subscriber stations 20, 30, formation and then transfer of messages 5 having the CAN FE format, and reception of such messages 5, can be implemented.

Figure 2:
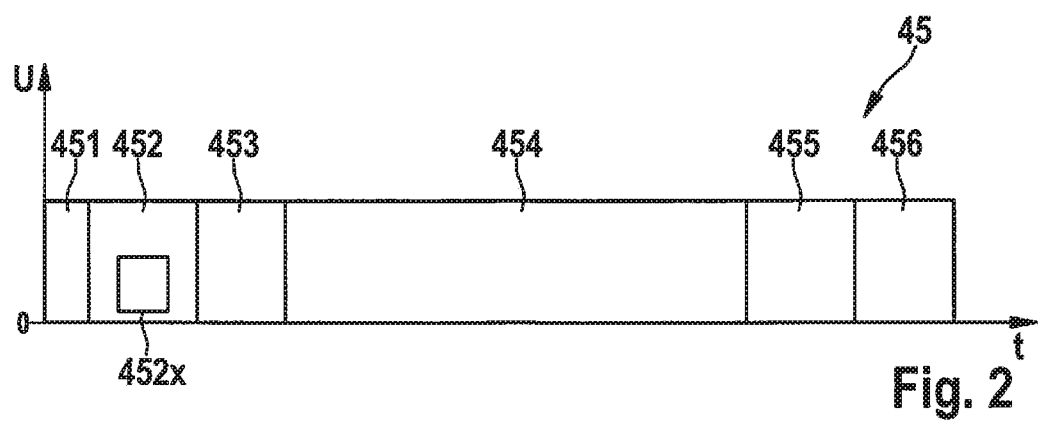
FIG. 2 is a diagram to illustrate the structure of messages that can be transmitted by subscriber stations of the bus system in accordance with the first exemplifying embodiment.

FIG. 2 shows, for message 5, a CAN FE frame 45 that is transmitted by transmit/receive device 22 or transmit/receive device 32. For CAN communication on bus line 3, CAN FE frame 34 is subdivided into different fields, namely a start field 451, an arbitration field 452, a control field 453, a data field 454, a checksum field 455, and an end field 456.

Start field 451 has, for example, one bit, which is also called an "SOF" bit to indicate "start of frame." Arbitration field 452 contains an identifier $452x$, having, for example, 32 bits, to identify the transmitter of the message. Arbitration field 452 can additionally contain a protocol format datum, made up of one or several bits, which is suitable for distinguishing CAN FE frames from CAN frames or CAN FD frames.

Control field 453 contains a data length code, for example 13 bits long, which can then, for instance, assume values from 1 to 4096 with an increment of 1, or can also assume values from 0 to 4095. The data length code can also encompass fewer or more bits, and the value range and the increment can assume other values. Control field 453 can additionally contain a protocol format datum, made up of one or several bits, which is suitable for distinguishing CAN FE frames from CAN frames or CAN FD frames.

Data field 454 contains the payload data of the CAN FE frame or of message 5. In accordance with the value range of the data length code, the payload data can encompass, for example, up to 4096 bytes. Checksum field 455 contains a checksum regarding the data in data field 454, including the stuff bits that are inserted as an inverse bit, after every ten identical bits, by the transmitter of message 5. End field 456 contains at least one acknowledge bit and furthermore a sequence of 11 identical bits that indicate the end of CAN FE frame 45. With the at least one acknowledge bit it is possible to convey whether or not a receiver has detected an error in the received CAN FE frame 45 or in message 5.

As in the case of CAN and CAN-FD, a physical layer is used in the phases for transmitting arbitration field 452 and end field 456. An important point during these phases is that the known CSMA/VR method is used; this allows simultaneous access by subscriber stations 10, 20, 30 to bus line 3 without destroying the higher-priority message 4, 5. As a result, it is relatively simple to add further bus subscriber stations 10, 20, 30 to bus system, which is highly advantageous.

The consequence of the CSMA/CR method is that so-called "recessive" states, which can be overwritten by other subscriber stations 10, 20, 30 with dominant states on bus line 3, must exist on bus line 3. In the recessive state, high-impedance conditions exist at the individual subscriber stations 10, 20, 30, resulting, in combination with parasites in the bus layout, in longer time constants. This leads to a limitation of the maximum bit rate of the present-day CAN FD physical layer to, at present, approximately 2 megabits per second in real vehicle use.

Control field 453 and data field 454 are not transmitted onto bus line 3 by a transmitter of message 5 until subscriber station 20, constituting the transmitter, has won the arbitration and subscriber station 20, constituting a transmitter, thus has exclusive access to bus line 3 of bus system 1 in order to transmit fields 453 to 456. In the context of arbitration, with the aid of identifier 452*x* in arbitration field 452 a bit-wise negotiation takes place between subscriber stations 10, 20, 30 as to which subscriber station 10, 20, 30 wishes to send the highest-priority message 4, 5 and therefore receives exclusive access to bus line 3 of bus system 1 for the near future in order to transmit fields 453 to 455.

The arbitration at the beginning of a frame 45 or of message 4, 5, and the acknowledgment in end field 456 at the end of frame 45 or of message 4, 5, are possible only when the bit time is considerably more than twice as long as the signal transit time between any two subscriber stations 10, 20, 30 of bus system 1. The bit rate in the arbitration phase upon transfer of fields 451, 452, 456 is therefore selected to be slower than in the other fields of frame 45.

The newly developed "CAN FE" that is provided is intended to have the following properties that differ from CAN or CAN FD:
a) retention and, if applicable, adaptation of proven properties that are responsible for the robustness and user-friendliness of CAN and CAN FD, in particular a frame structure having an identifier and arbitration in accordance with the CSMA/CR method;
b) increase in net data transfer rate to approximately 10 megabits per second;
c) increase in the amount of payload data per frame 45 to approximately 4 kb;
d) optionally: complete or partial elimination of transmission of error frames when errors are detected.

Arbitration proceeds in accordance with the CSMA/CR method, with no change with respect to classic CAN and CAN FD. As before, there are still therefore only two states during arbitration: "pos. dominant" and "recessive." This reduces the outlay for introducing and converting to the bus system according to the present invention. With suitable measures it is also possible to enable coexistence of the CAN FE frames with CAN and/or CAN FD frames, or tolerance of CAN FE frames on the part of CAN and CAN FD subscriber stations.

As described in more detail, for example, with reference to FIGS. 3 to 6, according to the present invention, a node, for example subscriber station 10 or any other subscriber station 20, 30, N, can transmit a abort signal 7 in order to terminate the transfer of a frame. The frame can be a CAN FE frame 45 or a classic CAN frame or a CAN FD frame. The abort signal can be configured (physically and in terms of time) in many ways, as will be described below using different variant embodiments.

Introduction

Figure 3:
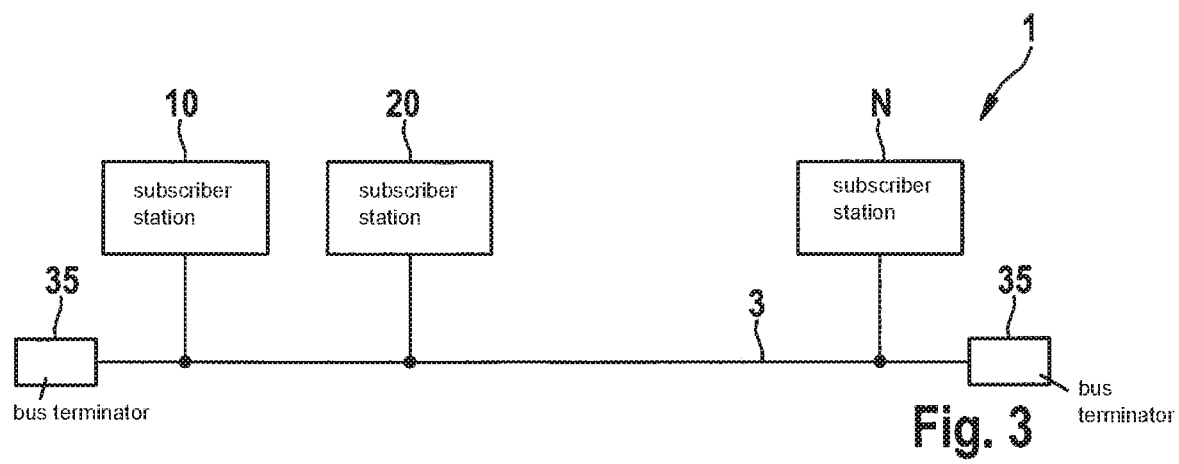
FIG. 3 is an additional simplified block diagram of the bus system in accordance with the first exemplifying embodiment, to explain an example of aborting a frame for a message in the bus system.

FIG. 3 shows by way of example, in a depiction that is slightly modified compared with FIG. 1, a bus system 1 having N nodes; a "node" is a bus subscriber, so that subscriber stations 10, 20, 30 of FIG. 1 in particular each constitute a node of bus system 1. In FIG. 3 as well, nodes or subscriber stations 10, 20, 30 to N are connected to bus line 3. The bus that is constituted by bus line 3 furthermore possesses a bus terminator, which is labeled with the reference number 35 and, in particular in accordance with the aforementioned CAN protocol specification, is a resistor having a value of 120 ohms. The N nodes or subscriber stations 10, 20, 30 to N arbitrate with regard to bus access. The frame having the highest priority prevails on the bus and is transferred.

Figure 4:
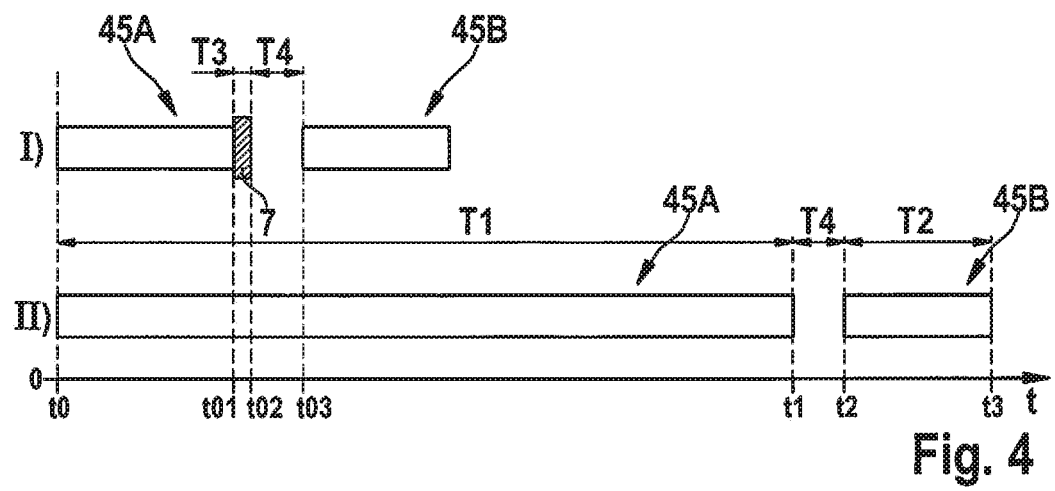
FIG. 4 shows a time course for aborting a transmission of a frame in the context of the first exemplifying embodiment, as compared with a time course in which transmission of the frame is not aborted.

FIG. 4 shows by way of example, plotted against time t, the manner in which abortion of the transfer proceeds. In the example, at a time t0 as shown in the lower part of FIG. 4, subscriber station 20 has begun to transfer a frame 45A having a long data field 454, which is aborted beginning at a time t01 as shown in the upper part of FIG. 4.

As shown in the lower part of FIG. 4, transmission of frame 45A on the bus in normal circumstances, i.e. without abortion, requires a time span T1 that begins at time t0 and ends at a time t1. A frame 45A of this length is, for example, a CAN FE frame 45 which is longer than a classic CAN frame or a CAN FD frame as described earlier with reference to FIG. 1 and FIG. 2. Once frame 45A has already been transferred, a software program in, for example, the receiving subscriber station 30 decides that a high-priority frame 45B is to be transmitted. The high-priority frame 45B contains, for instance, the critical information that the vehicle in which bus system 1 is installed in this example is to be braked. The software is installed, in particular, in the electronic control unit (ECU) of subscriber station 30.

A high-priority frame 45B of this kind can be a CAN FE frame 45 or a classic CAN frame or a CAN FD frame. In the present example, high-priority frame 45B is a classic CAN frame or a CAN FD frame that is shorter than frame 45A, as also illustrated in the lower part of FIG. 4 and as described previously. Transmission of frame 45B on the bus requires a time span T2 that begins at a time t2 and ends at a time t3. A minimal inter-frame space, corresponding to a time span T4, is reserved between transfer of the long frame 45A and of the high-priority frame 45B.

Because frame 45A would still block the bus for too long, subscriber station 30 decides to abort frame 45A. In order to abort frame 45A, at a time t01 subscriber station 30 transmits abort signal 7, which has a duration T3 and has thus ended at a time t02. All the other nodes or subscriber stations 10, 20, 30 to N detect abort signal 7, including the transmitting node, i.e. subscriber station 20 in the present example. Subscriber station 20 stops transmitting. After aborting at time t02, but not necessarily immediately there-after, i.e. for example only after the predetermined time span T4 that corresponds to the minimal inter-frame space, the bus is once again idle. When the bus is idle, all the nodes or subscriber stations of bus system 1 which wish to transmit a frame begin transmitting. An arbitration of the frames is the consequence. In this example, the high-priority frame 45B of subscriber station 30 will win the arbitration.

Who Can Abort?

In principle, any node or any subscriber station 10, 20, 30 to N is permitted to transmit abort signal 7.

It can be a receiving node, such as subscriber station 30 in the example above.

It can also, however, be the transmitting node itself, i.e. in the example above, subscriber station 20 would have been able to carry out the abortion.

It can be a node that at the time is still participating in arbitration, i.e., possibly subscriber station 10 or a subscriber station N in the example above.

The decision as to whether or not abortion is to occur is made as follows: The situations in which an abortion is permitted could be predefined, for example by way of the at least one predetermined abortion criterion 50 of FIG. 1 which is implemented in particular by way of a fixed configuration in the control device, in particular in communication control devices 11, 21, 31 of nodes or subscriber stations 10, 20, 30, N. Alternatively, nodes or subscriber stations 10, 20, 30, N could also agree, upon startup of the network, i.e. of bus system 1, as to when abortion is permitted. In this case the at least one predetermined abortion criterion 50 is defined or configured not by the manufacturer but only later by the user.

Abortion criterion 50 could be specified with the aid of a metric. For example, abortion can occur if the metric exceeds a threshold value. Communication control devices 11, 21, 31 of nodes or subscriber stations 10, 20, 30, N make a corresponding decision for this purpose utilizing abortion criterion 50. It is thereby possible to control how aggressively abortion occurs in bus system 1 that constitutes a network.

The metric could encompass the following values, among others:

remaining transfer time span for the current frame 45, 45A, 45B on the bus; and/or priority of the current frame 45, 45A, 45B on the bus; and/or priority of the higher-priority frame 45, 45A, 45B that is to be transmitted.

Communication control device 11, 21, 31 can furnish as a datum, for example in at least one register 60 of its subscriber station 10, 20, 30 which can be configured in particular as a flip-flop, memory, etc., the aforementioned remaining transfer time span or transmission time span of the current frame and/or the already-received bits of identifier 452x (ID bits). Registers 60 can alternatively be disposed externally to the respective communication control device 11, 21, 31. Using this aforementioned datum, a software program in the subscriber station can, in particular, determine the metric for deciding whether an abortion criterion 50 exists. If one does exist, the software can instruct communication control device 11, 21, 31 to abort, in particular to transmit an abort signal.

The remaining transfer time span can be indicated, for instance, as an absolute time at which transfer of the frame ends. Alternatively, the remaining transfer time span can be indicated, for example, as a relative time that is continuously updated, for example a countdown, where 0 means that the frame has been completely transferred.

The transmitting subscriber station can always furnish the entire identifier (ID) 452x, since it knows it. Alternatively, the transmitting subscriber station can furnish only as many bits 452x of the identifier as have already been transmitted.

According to a special variant, aborting via a CAN error frame is possible, any abortion point being selectable here as is known from the aforementioned DE 10 2012 209 093 A1.

Aborting Via Designated Break Points 60 According to FIG. 5

A designated break point 60 is defined for the points at which a frame 45, 45A, 45B is to be capable of being aborted. A designated break point 60 is made up of one or several contiguous bits 61 in frame 45, 45A, 45B which are serially transmitted over time t. Designated break point 60 in FIG. 5 has, as an example, only one bit. The other bits 61 have any value, this being indicated in FIG. 5 as "D".

Bits 61 of a designated break point 60 are coded on the physical layer in such a way that bits 61 can be overwritten. The "physical layer" corresponds to the bit transfer layer, or layer 1 of the known open systems interconnection (OSI) model. The node that wishes to abort the frame currently being transmitted, i.e., subscriber station 30 in the previous example, must overwrite one or several bits 61 of a designated break point 60.

In CAN, for instance, a designated break point 60 can be implemented using a recessive bit R (corresponding to a logical 1), as shown in FIG. 5. As shown in FIG. 6, a node or subscriber station could then overwrite the recessive bit R by transmitting a dominant bit B (a logical 0), so that the dominant bit is the determining bit. When the transmitter, i.e. subscriber station 20 in the previous example, then detects the dominant bit B (instead of the recessive bit R of FIG. 5) at designated break point 60, the transmitter aborts the transmission. The transmitter therefore interprets the dominant bit B as abort signal 7.

There are a number of possibilities or alternatives for configuring designated break point 60, which will be described below. These possibilities or alternatives can be combined in any way. What is important is that all the nodes or subscriber stations 10, 20, 30, N on the bus be aware of designated break points 60.

In the example of FIGS. 5 and 6, designated break bits are used in the arbitration phase (slow bit rate; sufficiently slow that a CAN arbitration can proceed correctly in the stipulated bus system) that is described above with reference to FIG. 2.

The "arbitration phase" is to be understood as that phase of a frame in which the bit rate used is the one also used for arbitration. The various possibilities here are those recited below, which can be utilized individually or in combination.

According to one possibility, K bits of the identifier (ID), which is disposed in arbitration field 452 of frame 45 of FIG. 2, are followed by a recessive designated break (SB) bit R constituting designated break point 60. It is the case here that the priority of the incoming frame 45, 45A, 45B is more accurately known with each received identifier bit (ID bit). A decision can therefore already be made early on that the currently relevant frame 45, 45A, 45B must be aborted. For example, K could be equal to 8. For a frame 45, 45A, 45B having, for example, 32 ID bits, there would then be exactly four SB bits: a bit R after eight ID bits, a bit R after 16 ID bits, a bit R after 24 ID bits, and a bit R after 32 ID bits. The last SB bit is after the last ID bit, and the abort node or subscriber station thus knows the exact priority of the current frame 45, 45A, 45B on the bus.

According to another possibility, the bits of the data length code, which encode the length of data field 454, are followed directly by a recessive SB bit R. In this case bits 61 that encode the length of data field 454, and at least also SB bit R, are transmitted at the slow bit rate. This is the case at present, for example with classical or classic CAN, and with CAN FD with no bit rate switchover.

According to yet another possibility, a recessive SB bit R can be inserted at predefined points in data field 454 that contains the payload data, as described previously with reference to FIG. 2. For example, a recessive SB bit is inserted respectively after the 25th, 75th, 175th, 300th bit 61 in data field 454. This could also be utilized with classic CAN frames, in which data field 454 is transmitted at the bit rate that is also used for arbitration.

According to yet another possibility, a recessive SB bit R can be inserted in data field 454 after N bits in data field 454 that contains the payload data, as described earlier with reference to FIG. 2. For example, an SB bit is inserted after every N=100 bits. N can depend on the bit rate that is set. For example, it can be the case that the higher the bit rate, the higher N also should be, in order to achieve a quasi-constant time interval between two SB bits R of designated break points 60. This could also be applied to classic CAN frames, in which data field 454 is transmitted at the bit rate that is also used for arbitration.

FIG. 7 shows an example of an SB bit field made up of M bits at the high bit rate for designated break bits in the data phase (high bit rate) which are used as a designated break point 60 in a bus system 1 in accordance with a second exemplifying embodiment. The "data phase" is to be understood as the phase in which a high bit rate is used. This is possible because only one transmitter exists, namely the one that has won the arbitration. The two basic possibilities below exist for inserting a designated break point 60 in this phase of frames 45, 45A, 45B.

According to one possibility, a bit field having M recessive bits R with bit time T is inserted as designated break point 60. The collective time span T3+T5+T6 of the M bits of designated break point 60 must be at least as long as the longest possible round-trip time (RTT) T5 (i.e. the maximum transit time for a signal to the farthest end of the bus and back, which is the maximum transit time of a signal from subscriber station 10, 20, 30, N to the farthest end of bus line 3 and back) in bus system 1, plus the time span T3 during which the aborting node is transmitting the dominant abort signal 7, plus the duration T6 of an optional safety reserve 65 of X bits. This bit field length is necessary so that the subsequent bits D at the high bit rate are not overwritten because of the signal transit times of the dominant abort signal 7. FIG. 7 shows an example of a bit field constituting designated break point 60. The node that transmits an abort signal 7 transmits it only for a maximum of four bit times T of the short (fast) bits. This ensures that the data bits D that follow the bit field of designated break point 60 are not overwritten despite the signal transit time.

According to another possibility, which is illustrated in FIG. 8 as a third exemplifying embodiment, in data phase 458 a switch back to the slow bit rate occurs at a designated break point 60, with switchover phases 459. For this, subscriber stations 10, 20, 30, N of bus system 1 are configured to transmit a slow recessive bit R as a designated break point 60, and then to switch back to the high bit rate of data phase 458, as shown in FIG. 8 in an example for the SB bits that were embedded into data phase 458 by bit rate switchover. In other words, FIG. 8 shows, in an example, SB bits that have been embedded into data phase 458 by bit rate switchover.

It is alternatively possible, instead of switching back to the arbitration bit rate, to switch back to a bit rate that can still be achieved with the physical layer of CAN FD. It is now possible to continue transmitting the bits of data field 454 at that bit rate. The "stuff bit rule" present in the context of CAN also ensures the occurrence of recessive bits in the data stream. Those recessive bits can then be overwritten. The minimum length of designated break point 60 is determined as in FIG. 7; in this case the time span T3 must be selected so that at least one recessive stuff bit occurs during time span T3 and can then be overwritten. This corresponds to the worst case, in which data field 454 is made up only of logical zeroes that are being transmitted as dominant. The advantage of this variant is that the payload data rate is high, since data are constantly being transferred.

These two types of designated break point 60 in data phase 458 can both occur in one frame 45, 45A, 45B. As in the arbitration phase as well, these designated break points 60 can be inserted at any point in data phase 458; it is useful in particular, however, to insert designated break points 60, for example, after the bits that encode the length of the frame and/or, for example, at predefined bit positions in data field 454 that contains the payload data and/or, for example, after each N bits, where N can scale with the bit rate of data phase 458 in order to achieve a constant time interval between two designated break points 60, the interval being, for instance, 10 μs.

Aborting Via Physical Abort Signal 7

FIGS. 9 and 10 show a profile, plotted against time t, for the difference voltage $V_{DIFF}$ resulting from signals CAN-H, CAN-L on the bus or on bus line 3, in order to explain an example of aborting via a physical abort signal 7 that is used, in accordance with a fourth exemplifying embodiment, to abort a frame 45, 45A, 45B. FIG. 9 shows an example without frame abortion; FIG. 10 shows an example with frame abortion.

A physical abort signal 7 could be used to abort the transfer of a frame 45, 45A, 45B. This means that a bus state 303 that is not used for the ordinary transfer of data is encoded on the physical layer. An explicit example for CAN would be, in accordance with FIG. 9 and FIG. 10, that recessive and dominant bus states 302, 301 are used for the transfer of frames 45, 45A, 45B. In addition, an inverse dominant is used as a third bus state 303, i.e. VCAN_L>VCAN_H (for dominant it is usually the case that VCAN_L<VCAN_H). Third bus state 303 is used for signalization of an abortion, as shown in FIG. 10 for this example using an exemplifying signal profile. Alternatively, third bus state 303 can also be encoded as particularly dominant, i.e., with a greater difference voltage than in the case of dominant bus state 301. In each of these cases, third bus state 303 overwrites either the recessive or the dominant bus state 302, 301. If any other bus states are used as bus states 301, 302, i.e., not recessive and dominant bus states 302, 301, third bus state 303 can overwrite those any other bus states.

In the example shown in FIGS. 9 and 10, the node or subscriber station 20 decides to abort the current frame 45 or 45A. Its CAN protocol controller, i.e. communication control device 21, transmits an abort signal to the transceiver, i.e. transmit/receive device 22. The transceiver encodes abort signal 7 as a negative dominant bit or third bus state 303.

At all the receiving subscriber stations 10, 20, 30, N, the abort datum of abort signal 7 is detected by the transceiver, i.e., the respective transmit/receive devices 12, 22, 32, etc., and forwarded to the CAN protocol controller. Forwarding can be accomplished, for example, using an extra pin or terminal of the transceiver or via an RX pin that is the terminal for forwarding a receive signal RX from the transceiver to communication control device 11, 21, 31, etc. The CAN protocol controller of a node that is currently transmitting a frame 45 or 45A, i.e. for example communication control device 31 of subscriber station 30, reacts to abort signal 7 by stopping the transmission operation. The CAN protocol controller of a node that is currently not transmitting but instead is receiving the transferred frame, i.e. for example communication control device 11 of subscriber station 10, reacts to abort signal 7 by stopping the receiving operation. A recessive bus state 301 becomes established, as illustrated in FIG. 10. After a delay time (inter-frame space T4) that is to be defined, the bus is once again recognized to be idle, and the transmission-ready nodes can once again participate in arbitration.

Advantages:

Abortion is possible at any point in frame 45, 45A, 45B;

No adaptation of frame format required;

Abort signal 7 can easily be distinguished from normal errors, i.e. error counter in CAN is not influenced by a frame abortion.

Disadvantage:

Physical coding of abort signal required;

therefore, possibly higher cost.

All the above-described embodiments of subscriber stations 10, 20, 30, N of bus system 1, and of the method set forth therein, can be utilized individually or in all possible combinations. In particular, all features of the exemplifying embodiments described above and/or modifications thereof can be combined in any way. Additionally or alternatively, the following modifications in particular are possible.

In particular, a combination of a physically coded abort signal 7 and designated break point 60 is possible.

The above-described bus system 1 in accordance with the exemplifying embodiments is described on the basis of a bus system based on the CAN protocol. Bus system 1 in accordance with the exemplifying embodiments can, however, also be a different type of communication network in which data are serially transferrable. It is advantageous, although not an obligatory prerequisite, that in the context of bus system 1, exclusive collision-free access by a subscriber station 10, 20, 30 to a shared channel is guaranteed at least for specific time spans.

The number and disposition of subscriber stations 10, 20, 30, N of bus system 1 of the exemplifying embodiments is arbitrary. In particular, subscriber stations 10, 20 of bus system 1 can be omitted. It is possible for one or several of subscriber stations 10 to be present in bus system 1. It is possible for one or several of subscriber stations 20 to be present in bus system 1. It is possible for one or several of subscriber stations 30 to be present in bus system 1.

Possibly, a subscriber station 10; 20; 30 for a serial bus system 1 is present, having: a communication control device (11; 21; 31) for generating a message (4; 5; 50; 500) that is to be serially transmitted to at least one further subscriber station (20; 30; 10) of the bus system (1), or for reading a message (4; 5; 50; 500) that has been serially received from at least one further subscriber station (20; 30; 10) of the bus system (1); and a transmit/receive device (12; 22; 32) for transmitting the generated message (4; 5; 50; 500) onto a bus line (3) to at least one further subscriber station (20; 30; 10) of the bus system (1), or for receiving a message (4; 5; 50; 500) from the bus line (3); the communication control device (11; 21; 31) and/or the transmit/receive device (12; 22; 32) being configured to provide in the message (4; 5; 50; 500) that is to be transmitted an ACK time window (46) for an ACK signal (461) and/or a NACK time window (47) for a NACK signal (471) for signalization as to whether or not at least one further subscriber station (20; 30; 10) has detected an error in the transmitted message (4; 5; 50; 500); and the transmit/receive device (12; 22; 32) being configured not to drive a level on the bus line (3) in the at least one provided time window (46, 47) in the context of transmission to the at least one further subscriber station (20; 30; 10).

What is claimed is:

1. A subscriber station for a serial bus system, comprising:
a communication control device configured to generate a message that is to be serially transmitted to at least one other subscriber station of the bus system, and/or to read a message that has been serially received by the subscriber station from at least one other subscriber station of the bus system; and
a transmit/receive device configured to transmit the generated message in a frame onto a bus line to at least one other subscriber station of the bus system, and/or to receive a frame of a message from the bus line;
wherein the communication control device is configured to decide whether there exists, for aborting a serial transmission of the frame onto the bus line which is currently being carried out, an abortion criterion according to which a serial transmission of a higher-priority frame for a message is more important than the serial transmission of the frame onto the bus line which is currently being carried out; and
wherein the communication control device is configured to provide in the frame currently being serially transmitted, on the basis of the decision that has been made, a signalization as to whether or not the frame currently being serially transmitted is to be aborted.

2. The subscriber station as recited in claim 1, wherein:
the communication control device is configured to halt transmission of the frame currently being serially transmitted after transmission of an abort signal constituting the signalization; and
the transmit/receive device is configured to halt reception of the frame currently being serially transmitted after transmission of the abort signal constituting the signalization.

3. The subscriber station as recited in claim 1, wherein the communication control device is configured to provide in the frame currently being serially transmitted, at at least one predetermined point for the signalization, a predetermined designated break point which the at least one other subscriber station uses for aborting the frame currently being serially transmitted.

4. The subscriber station as recited in claim 1, wherein the communication control device is configured to provide the signalization at a predetermined designated break point that is provided at at least one predetermined point in the frame currently being serially transmitted.

5. The subscriber station as recited in claim 4, wherein the predetermined designated break point has at least one bit.

6. The subscriber station as recited in claim 1, wherein the communication control device is configured, for the signalization, to overwrite, with a predetermined other bus state, a bus state that is provided in the frame currently being serially transmitted.

7. The subscriber station as recited in claim 6, wherein:
the bus state provided in the frame currently being serially transmitted is any bus state; and the predetermined other bus state is a dominant bus state or a negatively dominant bus state, or has a greater difference voltage than in the case of the dominant bus state.

8. The subscriber station as recited in claim 1, wherein: the communication control device is configured to transmit a message to the bus line using a first communication phase and a second communication phase; in the first communication phase, a negotiation occurs as to which of the subscriber stations is to acquire at least temporarily, in the subsequent second communication phase, exclusive collision-free access to the bus line.

9. The subscriber station as recited in claim 8, wherein the communication control device is configured to generate the message in such a way that bits in the first communication phase have a bit time that is longer by at least a factor of 10 than a bit time of bits that are driven onto the bus line in the second communication phase.

10. The subscriber station as recited in claim 9, wherein the communication control device is configured to provide, at at least one predetermined point in the first communication phase, a recessive bit constituting a predetermined designated break point for the signalization.

11. The subscriber station as recited in claim 8, wherein: the communication control device is configured to provide, at at least one predetermined point in the second communication phase, a predetermined number of recessive bits constituting a predetermined designated break point for the signalization; the predetermined number of recessive bits is defined in consideration of an addition of time spans T5+T3+T6; the time span T5 is a maximum transit time of a signal in the bus system from the subscriber station to a farthest end of the bus line and back; the time span T3 is a time span for transmission of the signalization; and the time span T6 is a duration of an optional safety reserve that encompasses a predetermined number of bits so that subsequent data are not overwritten by the signalization.

12. The subscriber station as recited in claim 8, wherein: the communication control device is configured to provide, at at least one predetermined point in the second communication phase, a switchover phase in which, before a predetermined designated break point for the signalization, a switchover occurs to a slower bit rate than a bit rate of the second communication phase; and the communication control device is configured to provide, after the predetermined designated break point, a switchover phase in which a switchover occurs from the slower bit rate back to the faster bit rate of the second communication phase.

13. The subscriber station as recited in claim 12, wherein: the communication control device is configured to continue transferring the data of the second communication phase in the predetermined designated break point and/or in the switchover phase.

14. The subscriber station as recited in claim 1, wherein the communication control device is configured to furnish for other devices of the subscriber station, as a datum in a register, a remaining transmission time span of a message currently being transmitted and/or the already-received bits of an identifier.

15. A bus system, comprising:
a bus line; and
at least two subscriber stations that are connected to one another via the bus line in such a way that the at least two subscriber stations can communicate serially with one another, each of the subscriber stations including:
a communication control device configured to generate a message that is to be serially transmitted to at least one other subscriber station of the bus system, and/or to read a message that has been serially received by the subscriber station from at least one other subscriber station of the bus system; and
a transmit/receive device configured to transmit the generated message in a frame onto a bus line to at least one other subscriber station of the bus system, and/or to receive a frame of a message from the bus line;
wherein the communication control device is configured to decide whether there exists, for aborting a serial transmission of the frame onto the bus line which is currently being carried out, an abortion criterion according to which a serial transmission of a higher-priority frame for a message is more important than the serial transmission of the frame onto the bus line which is currently being carried out; and
wherein the communication control device is configured to provide in the frame currently being serially transmitted, on the basis of the decision that has been made, a signalization as to whether or not the frame currently being serially transmitted is to be aborted.

16. A method for transmitting a message in a serial bus system, the method comprising the following steps:
generating, with a communication control device, a message that is to be serially transmitted to at least one other subscriber station of the bus system, and/or reading a message that has been serially received by the subscriber station from at least one other subscriber station of the bus system; and
transmitting, with a transmit/receive device, the generated message in a frame onto a bus line to at least one other subscriber station of the bus system, and/or receiving, with the transmit/receive device, a frame of a message from the bus line;
deciding, by the communication control device, whether there exists, for aborting a serial transmission of the frame onto the bus line which is currently being carried out, an abortion criterion according to which a serial transmission of a higher-priority frame for a message is more important than the serial transmission of the frame onto the bus line which is currently being carried out; and
providing, by the communication control device, in the frame currently being serially transmitted, on the basis of the decision that has been made, a signalization as to whether or not the frame currently being serially transmitted is to be aborted.

* * * * *